C. H. PRENTISS.

Assignor by mesne assignments to M. L. Hull.

GAS-HEATER.

No. 7,636. Reissued April 24, 1877.

Attest:
Chas. R. Searle.
L. T. Cook.

C. H. Prentiss,
Inventor.
By Worth Osgood
Atty.

THE NATIONAL LITHOGRAPHING COMPANY,
WASHINGTON, D. C.

UNITED STATES PATENT OFFICE.

CHARLES H. PRENTISS, OF CLEVELAND, OHIO, ASSIGNOR, BY MESNE ASSIGNMENTS, TO MARTIN L. HULL.

IMPROVEMENT IN GAS-HEATERS.

Specification forming part of Letters Patent No. 136,383, dated March 4, 1873; reissue No. 7,636, dated April 24, 1877; application filed March 17, 1877.

*To all whom it may concern:*

Be it known that I, CHARLES H. PRENTISS, of Cleveland, in the county of Cuyahoga and State of Ohio, have invented certain new and useful Improvements in Gas-Heaters or Vapor-Burning Stoves, of which the following is a full, clear, and exact description, reference being had to the accompanying drawing, and to the letters of reference marked thereon.

Figure 1:
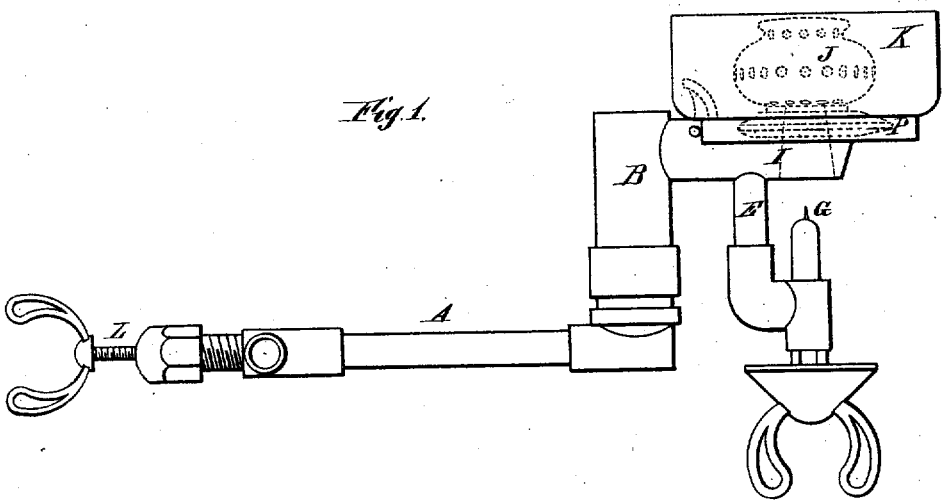
Figure 2:
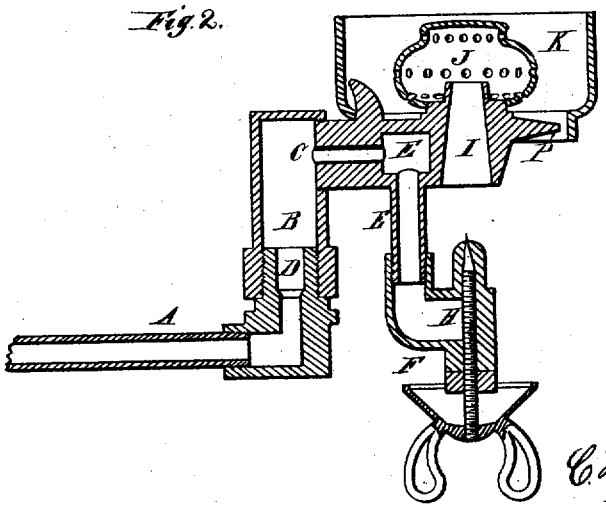

Figure 1 is an elevation of my improved gas-heater, and Fig. 2 an axial section thereof, showing the main features of the invention in detail.

Like letters in all the figures refer to corresponding parts.

My invention relates to that class of heaters wherein the light hydrocarbon oils are consumed after having been converted into gas, commonly known as "vapor-burners;" and it consists in certain novel arrangements and combinations of parts specially adapted or designed for the purpose of more easily and effectually converting the said oils into gas, preventing the roaring or blowing noise of the burner, and securing other advantages necessary to the successful operation of the stove, as will be hereinafter first fully described, and then pointed out in the claims.

A represents a tube that leads from a fount or reservoir in which the fluid is held, and which reservoir may be more or less distant and elevated above the burner. To said tube is secured a chamber, B, having in its upper end an outlet, C, of a small size in comparison to the inlet D at the lower end. Said outlet opens into a small heating-chamber, E, from which is an outlet, F, leading to, and terminating in, a jet-point, G, wherein a screw-valve, H, is fitted, for regulating the flow of the vapor or gas that issues from said jet point or orifice.

Above this orifice, and at a little distance therefrom, is a tube or funnel, I, which receives the combined air and gas, and conducts it to the enlarged crown or cone shaped chamber J, above.

This hollow crown or cone is provided with perforations located in horizontal lines, and extending around said cone, as shown, for the passage of the mingled air and gas, so that the flame arising therefrom shall extend outwardly about equal distances on all sides. It is commonly known as the "burner" or "burner-top," and the tube I, leading thereto, is made as short as is consistent with the offices it fulfils—*i. e.*, it should be capable of conducting a sufficient quantity of air with the gas in order to consume all the carbon therein, and, at the same time, be so short as not to materially retard the current of gas, as is usual in burners intended for lighting purposes.

As indicated in the drawing, the tube is between one and two times as long as the crown is high, and is of considerably less diameter, so that its capacity for containing gas shall be less than that of the crown.

The crown or bell rises from a nearly flat or horizontal bottom, through which the beforementioned tube passes, making the expansion-chamber larger at the base than at the top, which form is easy and simple to construct, and contributes in some degree to the requisite noiselessness of the burner.

The gas issues from the orifice G with considerable force and compels a current of air to follow it up through the pipe I. The crown above being considerably larger than said pipe, and, therefore, holding a larger volume of gas, as previously explained, serves to afford an expansion-chamber for said gas, from which it issues through the perforations without noise, or with comparatively little noise.

This roaring or singing noise of the burner, when in operation, has been one of the chief objections to its use, and the difficulty, it is believed, has been overcome by the use of the enlarged bell or cone, as above explained.

From the construction shown, it will be observed that there is a free open space between the jet-orifice G and the mouth of the receiving-pipe I, which construction is obviously of advantage in affording an unobstructed passage for the currents of air which mingle with the gas. This, also, probably contributes in some degree to the noiselessness of the burner.

Surrounding the tube I, and beneath the cone J, is a plate, P, upon which the flame from the lower row of perforations in said cone impinges. This plate is denominated a "heater-plate," and serves to conduct heat to the generating-chamber and surrounding parts of the burner, thereby facilitating the conversion of the oil or fluid into gas, it being at all times (when the burner is in operation) exposed to the aforesaid flame, which practically fills the space between the cone and plate.

K is a shell or cup, the purpose of which is to prevent the flame from spreading too much. It is detachable from the burner, and is in no way capable of affecting the operations thereof, so far as regards the burning of the gas; but may, in some instances, be advantageously employed for the purpose specified, and also for the support of any cooking-vessel above the flame, for which it is well adapted.

The practical operation of the burner is substantially as follows: A fount or reservoir, containing a fluid from which the gas is to be generated, is so placed in relation to the burner as to be elevated above it. The flow of the liquid therefrom to the chamber B is regulated by a valve operated by a screw, L. The pressure of the fluid, in consequence of the height of the fount, forces it into the said chamber B, wherein it becomes heated, and thereby vaporized. The vapor passes at once into the chamber E, in which it becomes superheated, and in this condition it flows to and out at the jet-orifice G, more or less in quantity as the adjustment of the valve H will permit.

The gas-jet flows directly from the orifice into and through the pipe I, thence to and into the burner or shell J.

In the passage of the vapor from the point G to the tube I a certain amount of air is drawn in therewith, and the combined air and gas thoroughly intermingled, producing the inflammable gas necessary for burning.

In the ordinary gas-burner the flame is often liable to flicker or flutter, and is not of uniform volume. This is mainly caused by a pulsation of the current of gas due to a variable pressure.

To avoid this flickering of the flame, and to produce a steady and uniform one, is the purpose of the chamber B, which, in consequence of the large amount of vapor and fluid it contains, and the small opening at D opposes an elastic resistance to the pulsating current, so that a more uniform jet is produced, and, consequently, a steady and uniform flame.

The special purpose of the apparatus is for culinary uses and for heating purposes. For these the burner is supported in a frame for the further convenience of holding the cooking utensils (in which the cooking, &c., is done) over the flame.

I am aware that burners for lighting purposes have been constructed with an enlarged head and an elongated tube leading thereto, which is located above a gas-jet orifice controlled by a needle valve.

This form of construction is not capable of preventing the roaring or blowing noise alluded to, nor is it intended as a heater, since it is incapable of supplying the requisite amount of oxygen to produce that intense blue flame so necessary for heating purposes.

By reason of this insufficient supply of oxygen the flame produced by such burners is white, or nearly so, while that arising from the use of my improved burner is of the character styled "blue flame," or is in fact a heating-flame, and could not be used advantageously for lighting purposes.

Having thus fully described my invention, what I claim as new, and desire to secure by Letters Patent, is—

1. In a vapor-burner adapted for heating purposes, the combination, as before set forth, of an enlarged bell or crown perforated as explained, a short tube leading thereto, and a heater-plate surrounding said tube and operating to conduct heat to the other portions of the burner, substantially as and for the purposes explained.

2. In a vapor-burner adapted for heating purposes, the combination, as before set forth, of an enlarged bell or crown having a flat bottom and perforated, as explained, a short tube leading thereto, and a gas-jet orifice located below the mouth of said tube and controlled by a needle-valve, the arrangement being substantially such as described, and for the purposes set forth.

3. In a vapor-burner adapted for heating purposes, the combination, as before set forth, of a support for cooking utensils, an enlarged bell or crown, perforated as explained, a short tube leading thereto, and a gas-jet orifice located below the mouth of said tube and controlled by a needle-valve, for the purposes described.

4. In a vapor-burner adapted for heating purposes, the combination, as before set forth, of an enlarged bell or crown having a flat bottom, and perforated as explained, a short tube leading thereto, a gas-jet orifice located below the mouth of said tube and controlled by a needle-valve, and an oil or fluid reservoir having a contracted inlet and outlet, for the purposes explained.

5. In a vapor-burner adapted for heating purposes, the combination, as before set forth, of a support for cooking utensils, an enlarged bell or crown, perforated, as explained, a short tube leading thereto, a gas-jet orifice located below the mouth of said tube, and controlled by a needle-valve, and an oil or fluid reservoir having a contracted inlet and outlet, for the purposes set forth.

6. The chambers B and E, outlet C, jet-point G, and screw-valve H, combined with the tube I, burner J, and cup K, the several parts being constructed and arranged, as and for the purposes specified.

In testimony that I claim the foregoing I have hereunto set my hand in the presence of two witnesses.

CHARLES H. PRENTISS.

Witnesses:
GEO. W. SWEGAN,
EPHM. NUTE.